March 15, 1960  J. H. WILSON  2,928,505
BRAKE SYSTEM FOR HOISTING DRUMS
Filed Nov. 27, 1956  5 Sheets-Sheet 3
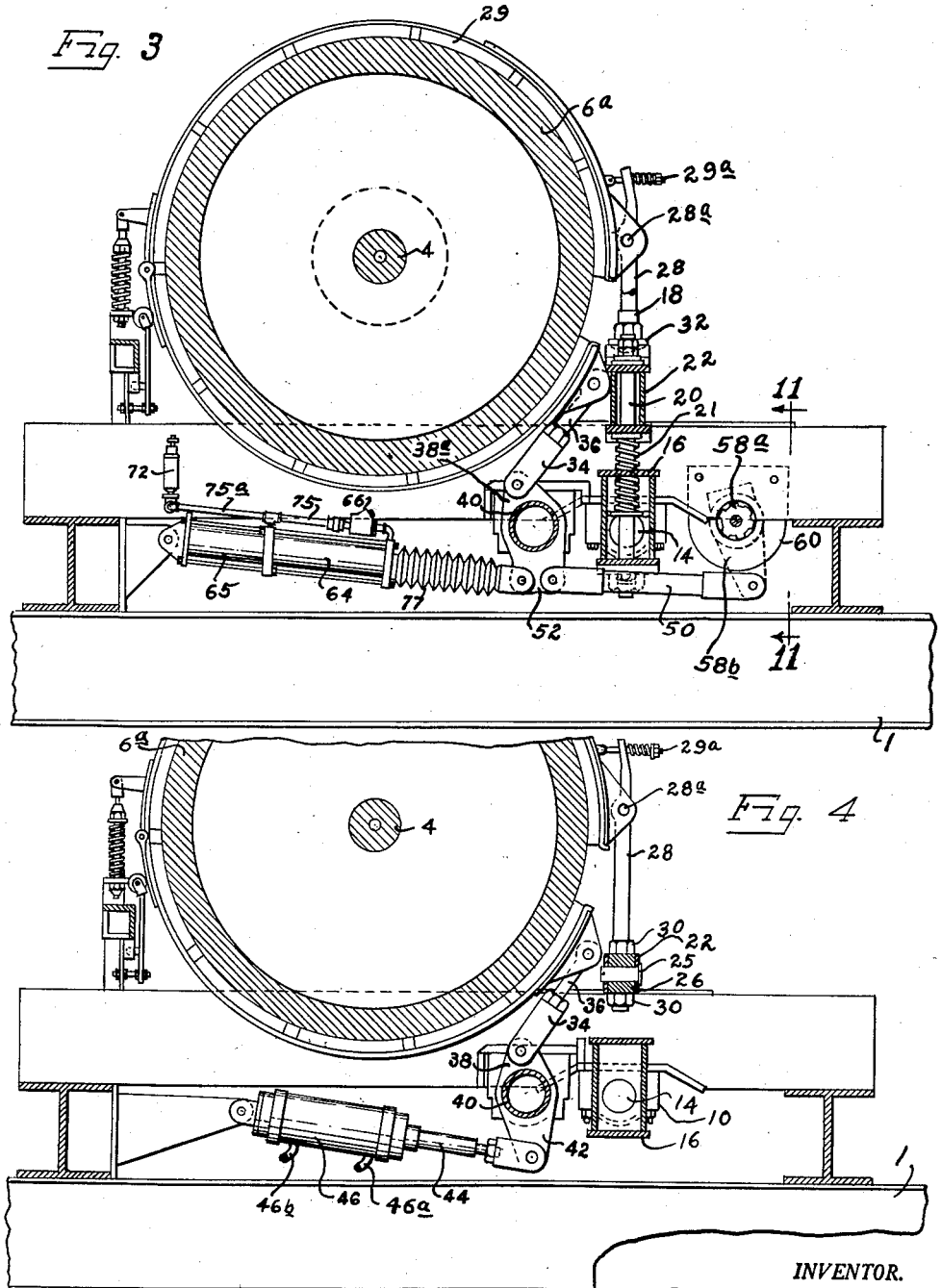
INVENTOR.
John Hart Wilson
BY
Wayland D Keith
HIS AGENT.

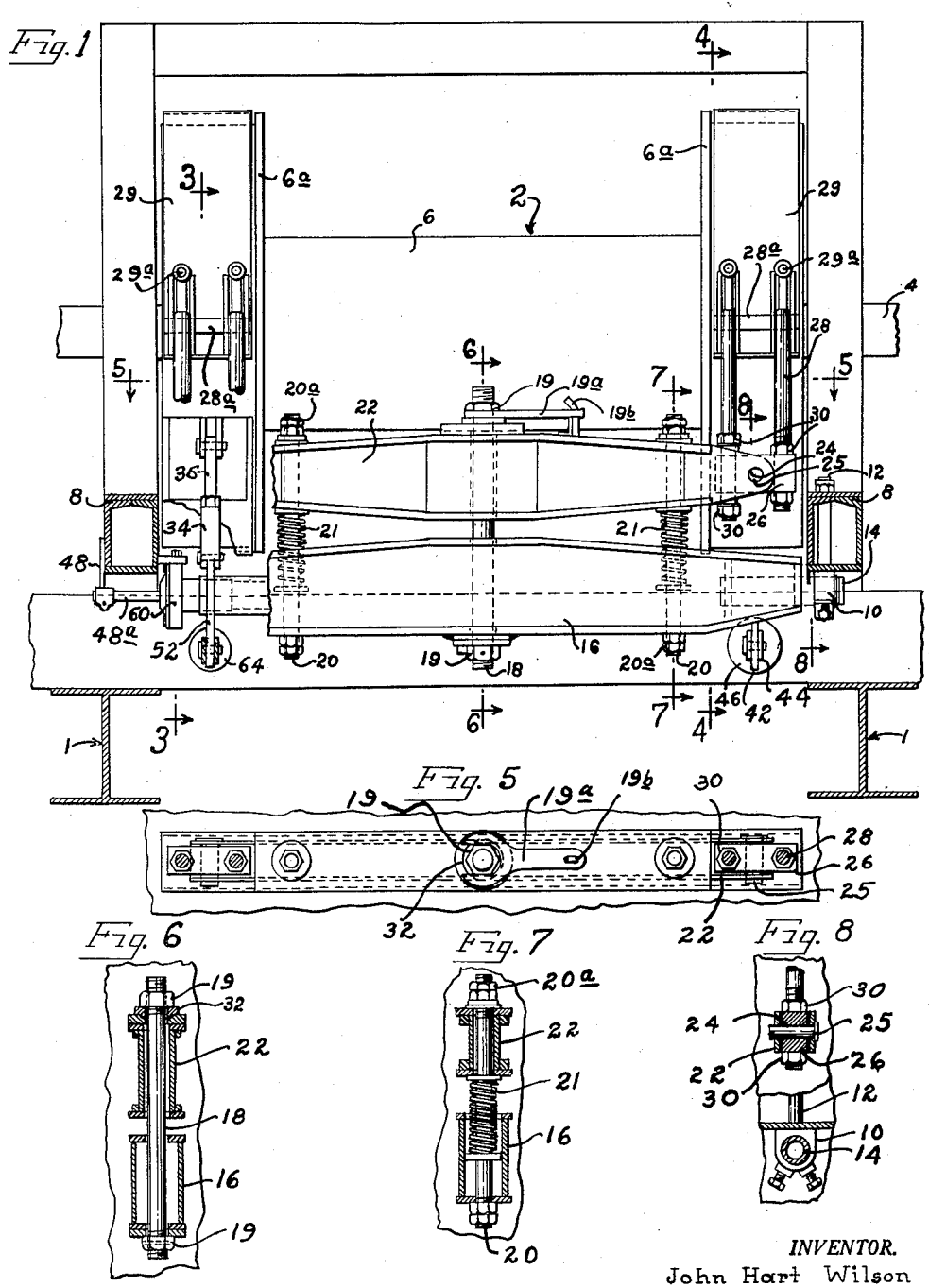

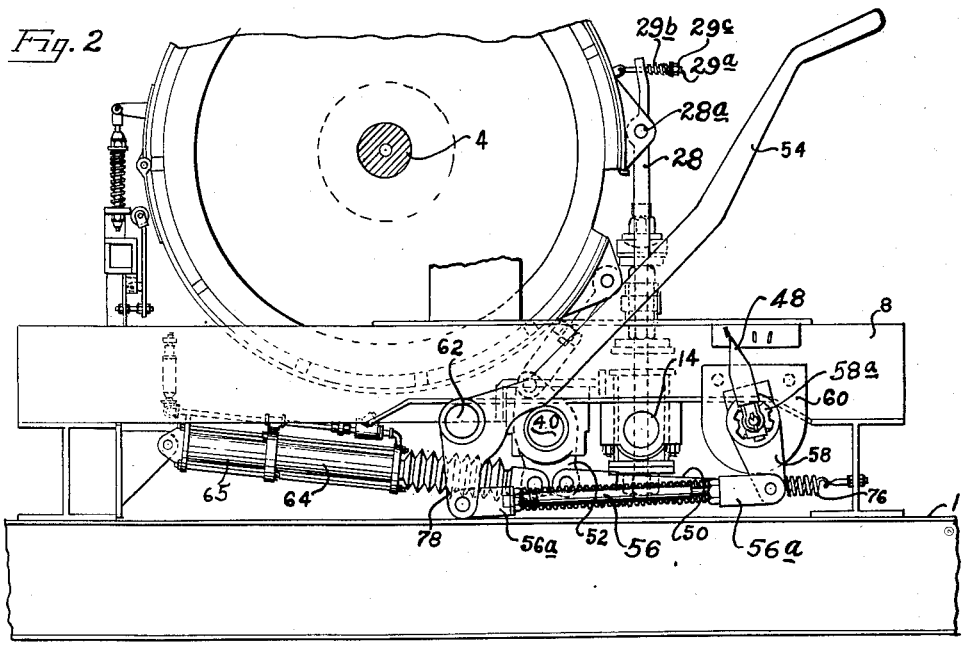
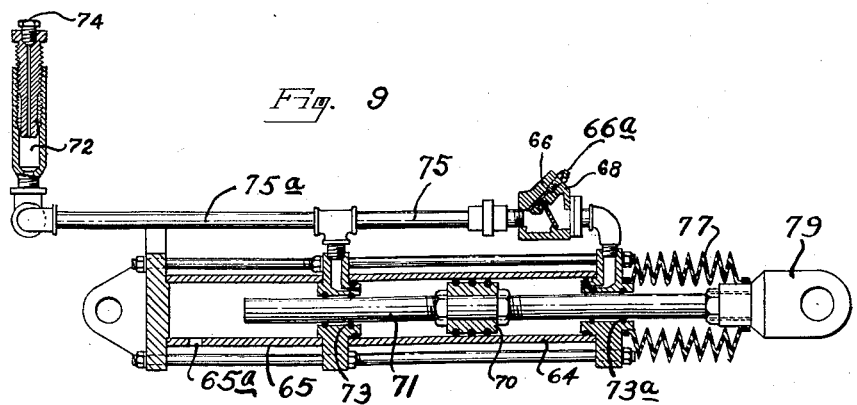
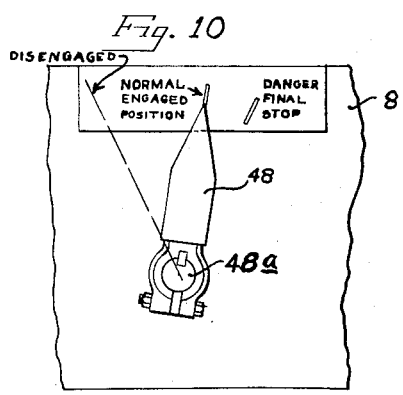
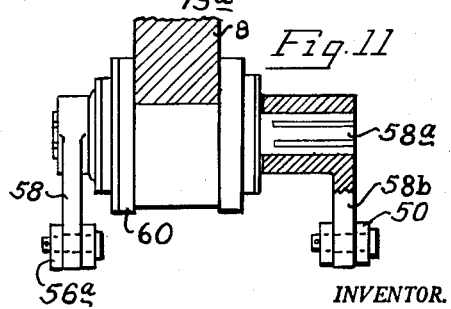
INVENTOR.
John Hart Wilson

March 15, 1960 J. H. WILSON 2,928,505
BRAKE SYSTEM FOR HOISTING DRUMS
Filed Nov. 27, 1956 5 Sheets-Sheet 4
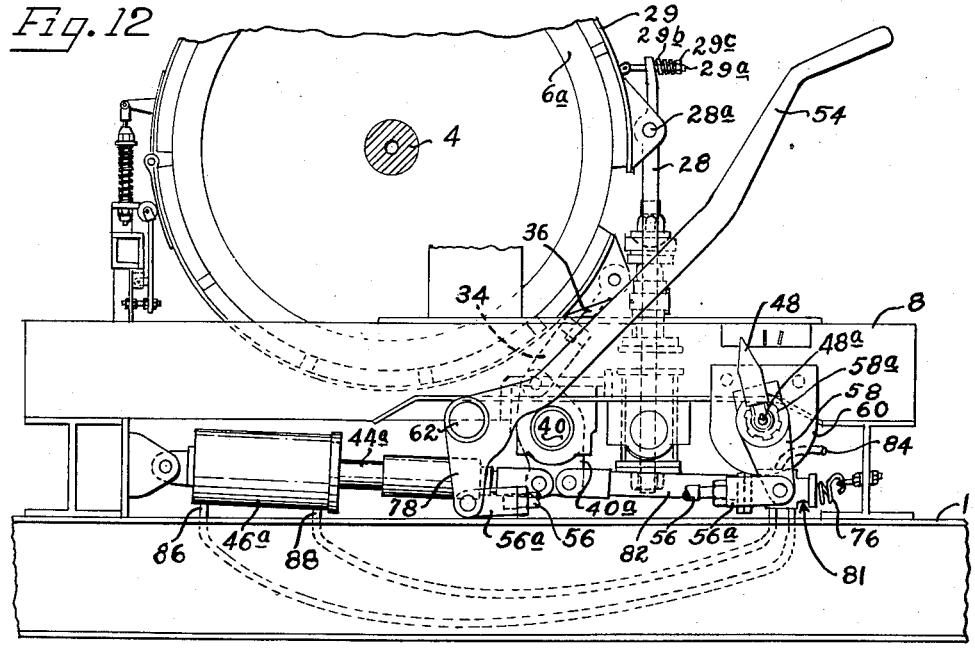
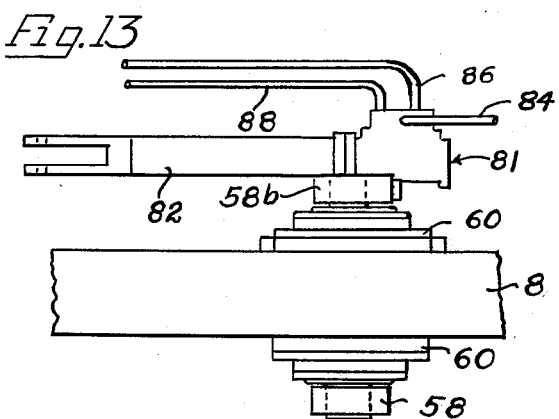
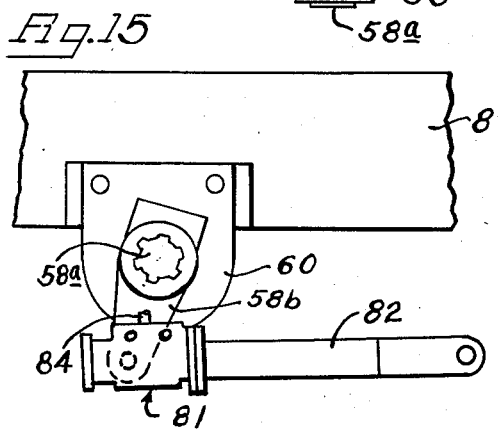
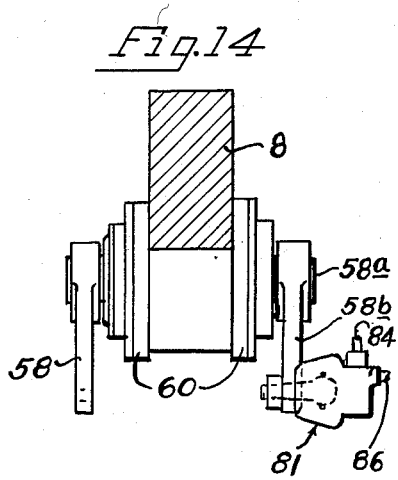
INVENTOR.
John Hart Wilson
BY
Wayland D. Keith
HIS AGENT.

March 15, 1960     J. H. WILSON     2,928,505
BRAKE SYSTEM FOR HOISTING DRUMS
Filed Nov. 27, 1956     5 Sheets-Sheet 5

INVENTOR.
John Hart Wilson
BY
Wayland D. Keith
HIS AGENT.

United States Patent Office

2,928,505
BRAKE SYSTEM FOR HOISTING DRUMS
John Hart Wilson, Wichita Falls, Tex.

Application November 27, 1956, Serial No. 624,608

4 Claims. (Cl. 188—77)

This invention relates to improvements in brake systems and more particularly to a brake system for hoisting drums such as used on drillings rigs, well servicing rigs, and the like.

Various brake systems have been proposed heretofore, but these, for the most part, failed to adequately equalize the brakes to compensate for wear on the friction elements of the brake, or for irregularities if one of the friction elements and/or one brake ring wears faster than another brake ring.

The present brake system equalizes the pull on both brake bands on the hoisting drum of a drilling rig or the like, and further equalizes an even pull on the entire width of each brake band, as well as compensating automatically for the wear on the brake bands.

An object of this invention is to provide a brake band equalizer which will equalize a pair of brake bands on a hoisting drum so that the brakes may be applied evenly to both brake rings.

Another object of this invention is to provide a brake band equalizer which will equalize the pull across the entire width of each brake band.

Still another object of the invention is to provide a brake band equalizer which will automatically compensate for unevenness of wear on the friction elements, so as to always apply a reaction pull substantially tangent to the brake ring.

Yet another object of the invention is to provide a brake system wherein the return movement of the brake lever is retarded by a hydraulic retarder, but which allows unimpeded movement in the opposite direction.

A further object of the invention is to provide a brake equalizer which, while equalizing the loads between the two brake bands, will avoid any bending strain on the eye bolts which connect the brake bands of the equalizer, due to the tilting of the equalizer beam.

A still further object of this invention is to provide a brake equalizer, which, while equalizing the load between the two brake bands, will avoid any bending strain on the eye bolts which connect the brake bands to the equalizer, due to wear on the blocks on the fixed ends of the brake bands.

With these objects in mind and others which will become manifest as the description proceeds, reference is to be had to the accompanying drawings, in which like reference characters designate like parts in the several views thereof, in which:

Fig. 1 is an elevational view of a hoisting drum, showing the brake equalizer installed thereon, with portions broken away and other portions shown in section, to bring out the details of construction;

Fig. 2 is a fragmentary side elevational view of a hoisting drum, showing the braking system thereon;

Fig. 3 is a sectional view taken on the line 3—3 of Fig. 1, looking in the direction indicated by the arrows;

Fig. 4 is a fragmentary sectional view taken on the line 4—4 of Fig. 1, looking in the direction indicated by the arrows;

Fig. 5 is a sectional view taken on the line 5—5 of Fig. 1, looking in the direction indicated by the arrows;

Fig. 6 is a sectional view taken on the line 6—6 of Fig. 1, looking in the direction indicated by the arrows;

Fig. 7 is a sectional view taken on the line 7—7 of Fig. 1, looking in the direction indicated by the arrows;

Fig. 8 is a sectional view taken on the line 8—8 of Fig. 1, looking in the direction indicated by the arrows;

Fig. 9 is an enlarged central, longitudinal sectional view through an anti-kick, dash-pot type hydraulic retarder, with portions shown in elevation;

Fig. 10 is an enlarged, fragmentary, elevational view of a brake position indicator;

Fig. 11 is a fragmentary sectional view taken on the line 11—11 of Fig. 3, looking in the direction indicated by the arrows;

Fig. 12 is a fragmentary, elevational view of a servo-air valve mechanism connected to the hand brake lever and to the air cylinder to actuate the brake bands;

Fig. 13 is an enlarged fragmentary plan view of the servo-brake actuating mechanism attached to the brake actuator shaft;

Fig. 14 is an end view of the mechanism shown in Fig. 13 with parts broken away and shown in section;

Fig. 15 is a side elevational view of the mechanism shown in Fig. 13;

Figure 16:
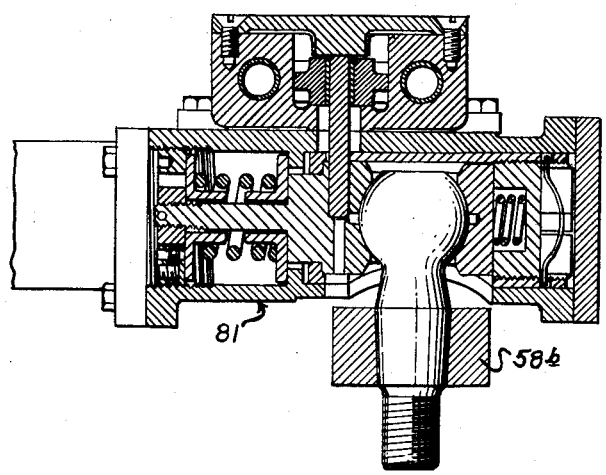
Fig. 16 is a sectional view through a conventional form of air servo-valve, such as shown in Figs. 12 through 15.
Figure 17:
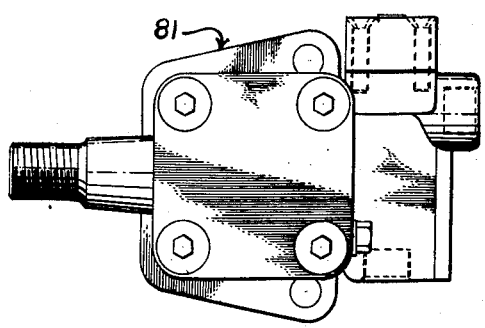
Fig. 17 is an end elevational view of the servo-valve mechanism, shown apart from the device.

With more detailed reference to the drawing, the numeral 1 designates the base of a rotary drilling rig, on which draw works or hoisting mechanism 2 is mounted. A shaft 4 is mounted upon the frame of the draw works 2, so as to support drum 6 thereon for rotation thereof about the axis of shaft 4. The drum 6 may be driven by a power unit, in any of several well known, conventional methods, for rotating the drum so as to wind cable thereonto, and to permit unspooling of the cable therefrom.

The frame of the draw works 2 has a sub-frame 8 secured thereto, which sub-frame extends substantially normal to the axis of the drum 6. Bearings 10 are mounted on sub-frame 8, on the lower side thereof, and are secured thereto by means of bolts 12. The bearings 10 pivot on axial shaft 14, which shaft is secured to a beam member 16 immediately forward of the brake flanges 6a of drum 6. The beam members 16 has vertical apertures passing therethrough, through the central aperture of which a central bolt 18 passes, and side bolts 20 pass through the apertures near each end thereof. The bolts 18 and 20 extend upward and pass through vertical apertures formed in a second beam 22. The bolt 18 has a nut 19 on each end thereof to enable the adjusting of the beam 16 relative to the beam 22. It is preferable to have the lower of the nuts 19 pinned or keyed, as by a cotter key, to prevent relative rotation thereof with respect to bolt 18.

Wrench 19a is provided for the nuts 19, which wrench 19a is locked in place by screw pin 19b passing through an aperture formed in the handle thereof.

It is preferable to have the apertures in one or both of the beams 16 and 22 loosely fitting around the respective bolts, so as to permit correct alignment of the brake equalizer beam 22 with respect to brakes 29. A spring 21 is telescoped over each of the bolts 20, intermediate the beams 16 and 22, so as to urge the beams apart. Nuts 20a are provided at each end of each bolt 20, so as to maintain bolts 20 in the correct relation with respect to beams 16 and 22. The beam 22 is bifurcated at each end, as will best be seen in Figs. 1 and 8, the bifurcated ends of which beam have transverse apertures 24 passing therethrough and through a swivel block 26. The swivel block 26 is positioned between the ears formed by the bifurcated ends of beam 22, which swivel block has a pair of brake band sustaining anchor bolts 28 attached thereto, which bolts are adjustable by means of nuts 30, so as to adjust each of the brake bands with respect to the brake equalizer beams.

In operation, it will be seen that, when the equalizer beam 22 swivels on spherical washer 32, the swivel blocks 26 pivot on the respective pins 25 to permit one brake band to move a greater distance than the other, when the brakes are applied, without tending to bend the eye bolts which connect to the respective fixed ends of the brake bands. Also, it can be seen that when the brake blocks on the respective fixed ends of the brake bands wear considerably, the equalizer beam 22 and the swivel beam 16 can swivel as a unit, about the shaft 14 in bearing 10, and about swivel 28a in the ends of eye bolts 28, where they attach to the fixed ends of the brake bands 29. The small eye bolt 29a, the spring 29b and adjusting nut 29c move an extension of the eye bolt 28 to provide an adjustment of the in and out position of the respective fixed ends of the brake bands 29.

The central bolt 18 has a spherical segment washer 32 thereon, beneath the upper nut 19, to permit limited pivotal movement of beam 22 thereon, as will best be seen in Figs. 1 and 6. The bolts 28 securely anchor brake bands 29, through blocks 26, to beam 22, whereupon, tension is transmitted through bolt 18 to transverse beam 16, which is pivotally mounted on shaft 14 below subframe 8. The other end of each of the brake bands 29 is secured, by means of a clevis and eye-bolt arrangement 34—36 to brake actuating levers 38, which levers, are in turn, secured to shaft 40.

The shaft 40 may be rotated by actuation of brake lever 54, to manually apply brake bands 29, however, to supplement or augment the application of the brake bands 29, a fluid cylinder 46 is provided, which has a double acting plunger 44 therein, so upon application of fluid pressure to supply lines 46a or 46b, by a suitable valve, the plunger 44, which is connected to shaft 40 through lever 42, will rotate shaft 40 in such degree as may be desired, since the valve may either be hand operated, foot operated, or servo-mechanism operated.

The levers 38 are of such length, and are connected to the respective clevises 34 in such manner as to exert a toggle action on the clevis, upon application of the brake, by fluid cylinder 44 operating by fluid pressure in cylinder 46.

An indicating pointer 48, as will best be seen in Fig. 10, is connected through a linkage arrangement 50 to a lever 52, so upon application of brakes, as by actuating lever 54 the pointer indicates the various stages of brake engagement.

A brake actuating lever 54 is pivotally mounted on shaft 62, which lever has a shorter lever 78 attached thereto and extending downward therefrom to which is connected a linkage 56, on which adjustable clevises 56a are mounted. One clevis 56a is pivotally connected to lever 78 and the other clevis 56a is mounted on brake actuator shaft 58a. A further lever 58b is mounted on shaft 58a and is connected through linkage 50 to lever 52 which is secured to shaft 40. The other end of the lever 52 extends upward and has a lever 38a thereon, which is pivotally connected to clevis 34 to actuate one of the brake bands 29. A further lever 38 is secured to the opposite end of shaft 40, to actuate the other brake band 29, when the brake lever 54 is applied. A clevis 79 is also attached to lever 52 to actuate the hydraulic retarder, as will be more fully set out hereinafter.

Clevises 56a are provided on linkage 56 for adjusting the relative position of the brake lever 54, to give the best operating height thereof for the individual driller. The clevis 56a connects to a lever 58, mounted on and splined to shaft 58a, which shaft 58a is mounted within bearings 60, as will best be seen in Figs. 2, 3, and 11.

Due to the reversal of drum 6, the brake actuating lever 54 often has a tendency to "kick" or to rotate about pivotal member 62. However, an anti-kick, dash-pot type retarder 64 is pivotally connected to lever 52, which lever, through linkages 34—36, is connected to the brake bands 29 and to the lever 54 by linkages 50 and 56, whereby, upon rotation of shaft 40, the piston 70 forces fluid from one end of cylinder 64 of the dash-pot retarder through a restricting orifice 66 in check valve 68 to the opposite end of the cylinder of the dash-pot retarder. However, upon the reverse movement of lever 54, the check valve 68 opens to permit free flow of fluid to the opposite end of the cylinder 64. A fluid reservoir 72 maintains the cylinder 64 filled with fluid at all times. An air bleeder 74 is provided to bleed air from the hydraulic system, as will best be seen in Fig. 9.

A needle valve 66a is provided for valve 68 to regulate the flow of fluid through orifice 66 from one side of the check valve member to the other side thereof.

A tension spring 76 is connected to the frame of the draw works 2 and to a lever 78 on brake lever 54, so as to urge the brake lever into release position.

A cylinder 65 is positioned in aligned relation with cylinder 64, which cylinder 65 has a vent 65a therein, so that the piston rod 71, on which piston 70 is mounted, may extend through an O-ring seal gland 73 into the cylinder 65. In this manner, the piston 70 displaces an equal amount of fluid on either the out stroke or the return stroke thereof. Therefore the hydraulic fluid circulated through pipe 75 from one side of the piston 70 to the other side thereof in cylinder 64, is equal at all times. In this manner, a closed hydraulic system may be had with a pipe 75a and reservoir 72 so that the system may be maintained sealed at all times, with the additional hydraulic fluid compensating for any leakage around O-ring seal glands 73 or 73a.

An accordion type boot 77 is connected in dust tight relation around the end of the cylinder 64 and the clevis 79 on connecting rod 71.

*Modified form of invention*

A modified form of the invention is shown in Figs. 12 through 17, wherein brake lever 54 is pivotally mounted on shaft 62, which brake lever 54 has a short lever 78 connected thereto and extending downward therefrom, to which a linkage 56 is connected by a clevis 56a. The other end of the linkage 56 is connected to a lever 58 by a further clevis 56a. The lever 58 is mounted on a splined shaft 58a which is journaled in bearings 60, so that the shaft 58a will be rotated upon movement of lever 54.

A shaft 48a is mounted on and extends outward from shaft 58a and has an indicating pointer 48 thereon to indicate the disconnected position of the brake bands 29, the engaged position of the brake bands 29 and the final stop position thereof.

A lever 58b is mounted on and secured to shaft 58a and extends downward and has a servo-valve mechanism 81 thereon, as will be best seen in Figs. 12 and 14. The valve is of a conventional character, such as shown in Fig. 16, wherein, as the lever 58b is moved, it actuates the valve mechanisms therein to direct fluid under pressure from the supply line. Since the servo-valve 81 is connected to a linkage 82 which connects with lever 40a, air will be directed from the supply line 84 through servo valve 81, and out through one of the air supply lines 46b or 46a, which lead to opposite ends of fluid actuating cylinder 46. In this manner, as pressure is manually applied to lever 54 to move servo-valve 81 and linkage 82 in either direction, fluid is supplied to the end of the cylinder 46 and pressure will be applied to the piston therein to move the plunger 44a in the desired direction and the air that is in the opposite end of the cylinder will be discharged out through the other of the supply lines 86 or 88 from that through which the air is being directed into the cylinder 46.

In this manner, the lever 54 is manually connected in such way as to rotate shaft 40, which is connected to the movable end of the brake bands 29 through clevises 34 and eye bolts 36. However, in addition to the manual application, air may be applied through servo-valve mechanism 81 to aid in the rotation of the shaft 40. The servo-valve mechanism is of conventional design and may be so set as to pass the required amount of air at such pressure as required, into cylinder 46 so as to augment the manual pressure on lever 54, or, if desired, the valve may be adjusted so that the lever 54 may be merely a valve actuator lever.

Having thus described the invention, what is claimed is:

1. A brake system for a hoisting drum comprising; a frame, a drum mounted on said frame for rotation about the axis of said drum, a brake ring secured to each end of said drum, a pair of brake bands mounted on said frame, each of said brake bands being cooperatively engageable with the respective brake rings, a first longitudinal beam, pivot means on said frame exterior of said brake rings pivotally mounting said first longitudinal beam for pivotal movement about a longitudinal axis thereof so said first longitudinal beam will be in substantially parallel relation to the axis of said drum, a second longitudinal beam positioned a spaced distance above said first longitudinal beam and being substantially parallel thereto and extending at least to the center of each of said brake rings, said first longitudinal beam and said second longitudinal beam each having a substantially vertical aperture formed therethrough medially of the length thereof, a central anchor member which is of substantially smaller diameter than the diameter of said apertures, which anchor member is positioned through said medial apertures of the respective beams, said anchor member having means on each end thereof to restrain said second longitudinal beam within a predetermined maximum pivotal movement with respect to said first longitudinal beam yet permitting limited pivotal movement of said second longitudinal beam relative to said central anchor member, a resilient support member positioned between said first and second longitudinal beams near each end thereof to flexibly support said second longitudinal beam with respect to said first longitudinal beam, means anchoring an end of each brake band to said second longitudinal beam near each end thereof, and means connected to opposite ends of said brake bands from said anchor means to actuate said brake bands.

2. A brake system as defined in claim 1, wherein said second longitudinal beam has a swivel block mounted near each end thereof, and wherein said means anchoring an end of each brake band comprises a pair of bars, each of which bars is independently adjustable, secured near an end of each of said brake bands and to said respective swivel blocks.

3. A brake system as defined in claim 1; wherein said support members comprise springs to resiliently support said second longitudinal beam with respect to said first longitudinal beam.

4. A brake system as defined in claim 1; wherein said first and second longitudinal beams are apertured with vertical, axially aligned apertures, one of which apertures is spaced outward on each side of said medial apertures, and wherein said central anchor member comprises a bolt; and wherein a bolt is provided through each pair of axially aligned apertures which are spaced outward from said central apertures, and a compression spring telescoped over each of said last mentioned bolts and positioned intermediate said first longitudinal beam and said second longitudinal beam to hold said beams in normal spaced apart relation.

References Cited in the file of this patent

UNITED STATES PATENTS

| | | |
|---|---|---|
| 1,165,230 | Degen | Dec. 21, 1915 |
| 1,805,808 | Crum | May 19, 1931 |
| 1,910,805 | MacClatchie | May 23, 1933 |
| 1,932,685 | Black | Oct. 31, 1933 |
| 2,112,166 | Laschinger et al. | Mar. 22, 1938 |
| 2,195,858 | Fuller | Apr. 2, 1940 |
| 2,257,722 | Maier | Sept. 20, 1941 |
| 2,465,164 | Maier et al. | Mar. 22, 1949 |